April 10, 1951     A. BENZ     2,547,993
SPRING AND AXLE ASSEMBLY FOR VEHICLES
Filed May 17, 1947     3 Sheets-Sheet 1
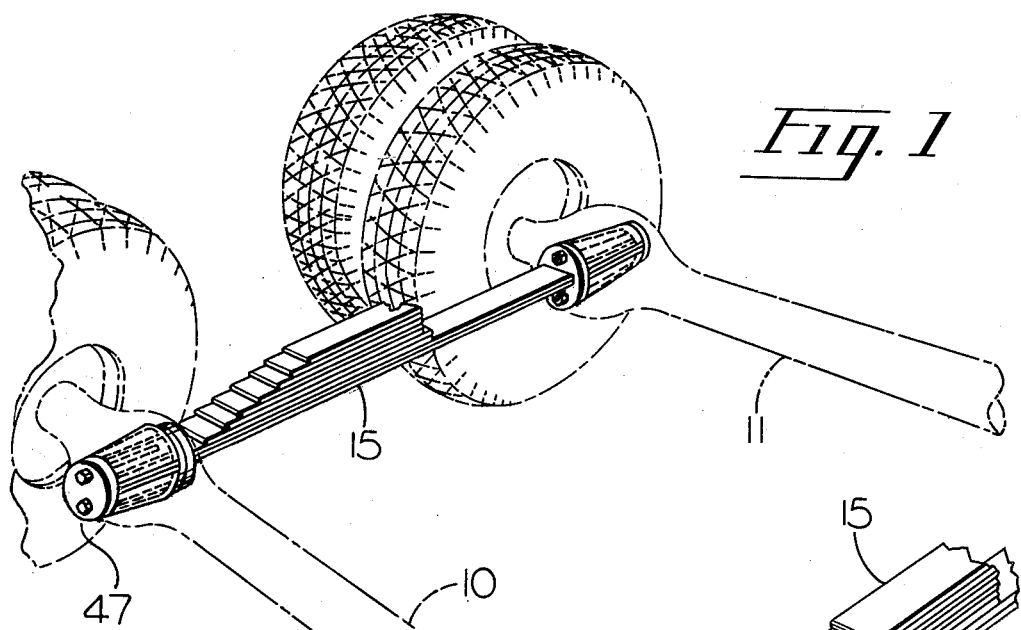
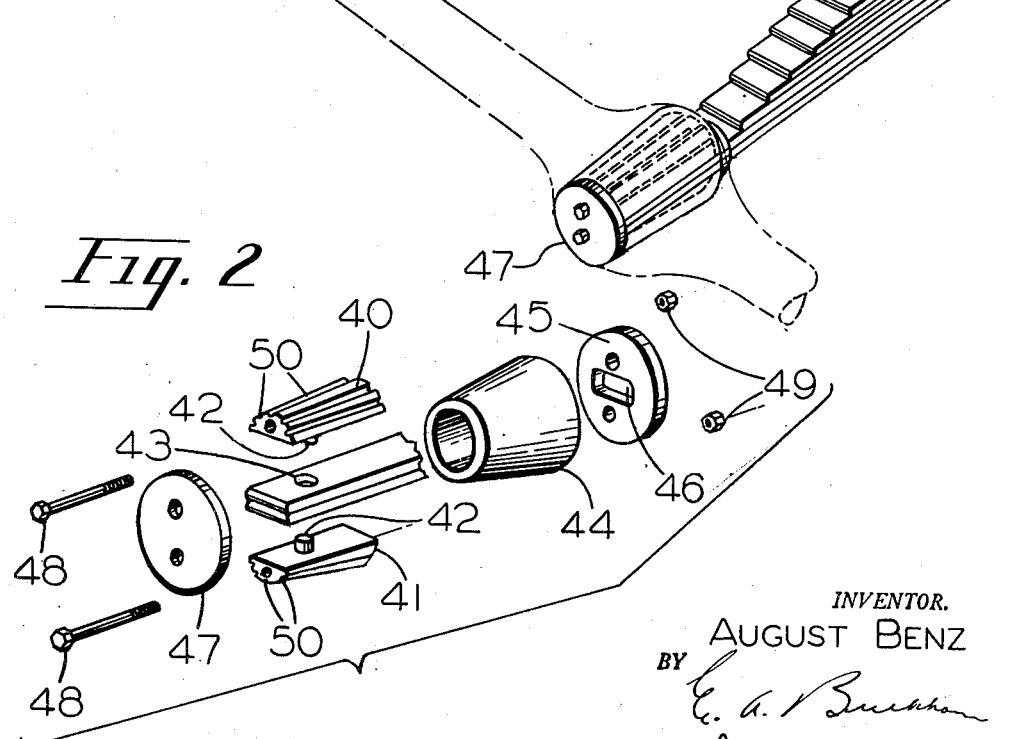
INVENTOR.
AUGUST BENZ
BY
ATTORNEY April 10, 1951          A. BENZ          2,547,993
SPRING AND AXLE ASSEMBLY FOR VEHICLES
Filed May 17, 1947          3 Sheets-Sheet 2
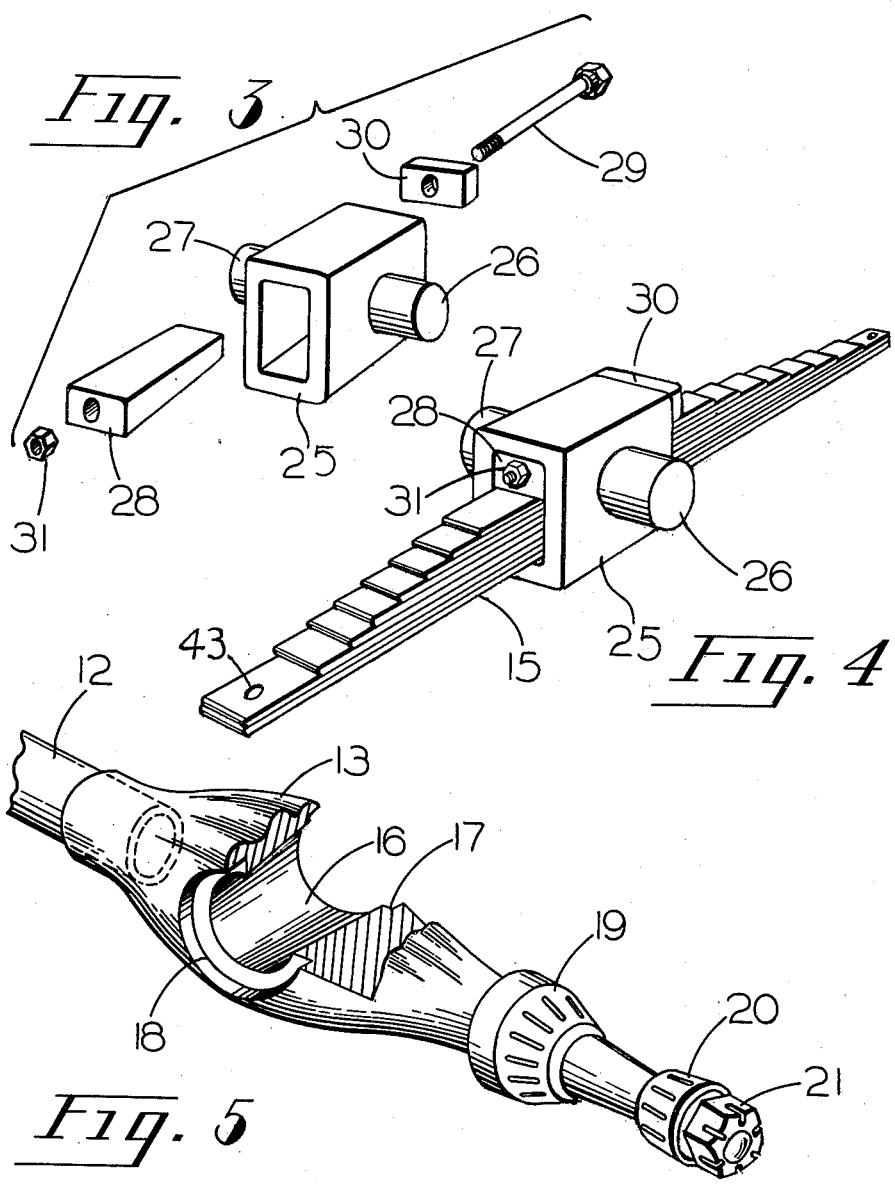
INVENTOR.
AUGUST BENZ
BY
ATTORNEY April 10, 1951            A. BENZ            2,547,993

SPRING AND AXLE ASSEMBLY FOR VEHICLES

Filed May 17, 1947            3 Sheets-Sheet 3

INVENTOR.
AUGUST BENZ
BY
ATTORNEY

Patented Apr. 10, 1951

2,547,993

UNITED STATES PATENT OFFICE 2,547,993

SPRING AND AXLE ASSEMBLY FOR VEHICLES

August Benz, Portland, Oreg.

Application May 17, 1947, Serial No. 748,763

10 Claims. (Cl. 280—104.5)

My present invention relates to a new and improved spring and axle assembly for vehicles such as trailers.

The principal object of the present invention is to provide a four wheel trailer having a load bearing body mounted upon springs extending between the pair of axles, in which the line of thrust of the forces created by braking the wheels when the loaded vehicle is in motion, or of starting the vehicle from a standing position, is in the plane of the axles rather than in a plane above or below the axles as is customary in such vehicles. This object of the invention is achieved by so mounting the springs that their ends are resiliently attached to and fixed within the axles along the longitudinal center lines thereof. In conventional vehicles the springs are mounted above or below the axles by means of shackles or the like, with the result that sudden changes in velocity or state of motion of the vehicle cause the forces created to be multiplied by the moment arms involved. In many instances the resulting strains are so great as to tear the springs from their shackles, snap spring blades, or break or twist other portions of the trailer assembly. The likelihood of such events occurring is substantially eliminated with my invention.

A further object of the present invention is to provide a simplified spring and axle construction for a trailer in which all parts are rugged, easily manufactured and assembled, and are protected against unusual shocks and strains.

A further object of the present invention is to provide a new and improved trailer of the type comprising a pivot and a load supporting member such as a logging bunk mounted thereon, wherein the relative rotation of the logging bunk with respect to the body of the trailer is achieved without undue wear or strain upon relatively moving parts. This object of the invention is brought about by the provision of rolling supports for the lateral ends of the logging bunk, which are sturdy, easily manufactured and easily assembled.

The foregoing and other objects and advantages of the present invention will be more readily understood from a study of the following specification taken in connection with the accompanying drawings wherein like numerals refer to like parts throughout. In the drawings Fig. 1 is a partial view in perspective of a pair of trailer axles and mounting members therefor shown in assembled relationship (with a part of axle and wheel assemblies drawn in skeleton outline for clarity) in which the springs are illustrated in the position they assume when loaded.

Fig. 2 is an expanded view in perspective of the parts of a spring mounting.

Fig. 3 is an expanded view in perspective of the parts of a spring shackle and trunnion member for attaching the body of the trailer to a spring assembly and for binding the spring leaves in assembled relation.

Fig. 4 is a view in perspective of the assembled spring leaves and spring shackle.

Fig. 5 is a view in perspective, with parts broken away, showing one method of fabrication of a trailer axle.

Figure 7:
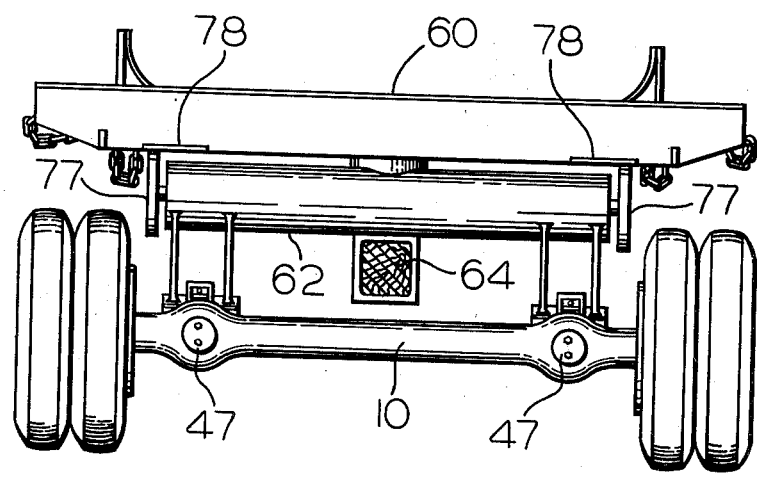
Fig. 7 is a rear view of a logging trailer having the present invention incorporated thereon, the springs being illustrated in the condition assumed when fully loaded.

The present invention comprises a trailer assembly including a spaced pair of axles 10 and 11 having wheels at their lateral ends. Each end of each axle comprises means for retaining an end of a spring assembly substantially intersecting the longitudinal axis of the axle. As seen in Fig. 7, each axle may comprise a forged or cast member having enlargements to provide means for associating the spring ends therewith, but the preferred form of fabrication of the axle is illustrated in Fig. 5 wherein it is seen that the ends of the axle comprise cast or forged members, into which are affixed the ends of a tubular central portion 12. The end members 13 are each provided with a transverse tapered bore 16 having countersunk end seats 17 and 18, the axis of the bore 16 running normal to and intersecting the axis of the axle assembly. The outer portion of the member 13 is formed in the usual fashion to provide the mounting for the trailer wheels, such as through means of the bearings 19 and 20 and the lock nut 21.

The leaf spring assemblies 15 are preferably held in associated relationship by the spring shackle assemblies illustrated in Figs. 3 and 4, each comprising a rectangular collar 25 from which laterally projecting trunnions 26 and 27 extend. The leaf springs are placed within the collar and are retained in assembled relation by a wedge 28 adapted to be drawn into the collar against the uppermost leaf spring by a bolt 29 passing through a block 30 adapted to bear against one end of the collar, the bolt also passing through a longitudinal bore through the wedge 28 and being threaded to engage a nut 31.

Two of the spring assemblies are associated with two axle assemblies to form a rectangular frame, all members of which lie in substantially the same plane, particularly when a heavy load is supported on the trailer. The assembly is accomplished by clamping the ends of the spring assemblies to the axles by means of the anchorage assemblies illustrated in detail in Fig. 2. Each anchorage assembly comprises a pair of tapered filler blocks 40 and 41, having flat faces adapted to engage the upper and lower surfaces of the longest spring or springs of the spring assembly, the filler members preferably being provided with lugs 42 adapted to engage holes 43 in the ends of the spring so as to prevent relative movement of the springs and fillers. A tapered rubber sleeve 44 is slipped over the filler members 40 and 41, the word "rubber" meaning any deformable material such as natural rubber or any of the commonly encountered artificial substitutes therefor, the material being cured or hardened to such an extent that it will sustain heavy loads and yet be resilient to absorb or cushion shocks. The sleeve is retained in position by an inner disc 45 having a rectangular slot 46 therethrough for the reception of the leaf spring ends, and an outer disc 47. The inner disc is adapted to be seated in the countersunk seat 17 of the axle member 13 an the outer disc 47 is adapted to be seated in the outer countersunk seat 18. A pair of bolts 48 are passed through aligned openings in the disc 47, filler members 40 and 41, and disc 45, and are retained by a pair of nuts 49 adapted to bear against the inner disc 45. Preferably the sleeve 44 is of such length that when the bolts are tightened as far as possible and the discs seated firmly in their respective seats, the sleeve will be compressed to such an extent as to cause the material to swell in a transverse direction, snugly and firmly to retain the ends of the springs in the axles. The sleeve 44 is preferably slightly longer than the filler members 40 and 41, while its inner and outer diameters are such that a snug fit is achieved prior to tightening the bolts 48. Since tightening of the bolts can be then achieved only if there is some space for the material to flow into, the outer surface of the filler members may be recessed, such as by providing the grooves 50 herein illustrated.

Figure 6:
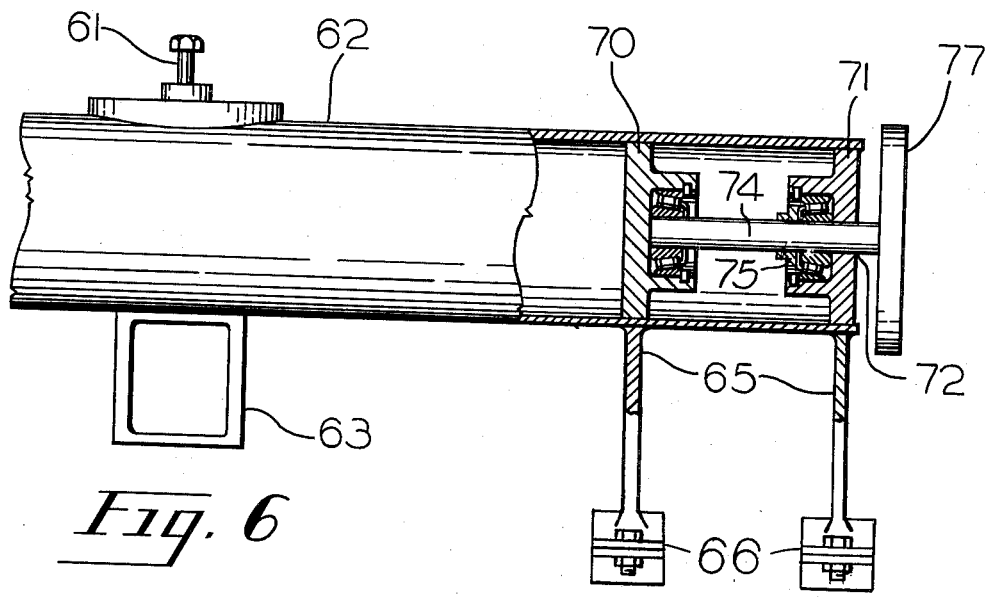
Fig. 6 is an end view, partially in section, of a portion of one form of trailer body which may be associated with the spring and axle assembly.

In Figs. 6 and 7 one form of trailer embodying the present invention is set forth. This trailer comprises a transverse logging bunk 60 pivotally mounted upon a central, vertical pivot 61 extending from the upper surface of the laterally extending hollow body 62. The lower surface of the body 62 supports a longitudinally extending sleeve 63 adapted to slidably embrace a trailer beam 64, one end of which may be attached to a towing vehicle. In such constructions means are provided (not herein shown) for clamping the sleeve to the beam so as to adjust the longitudinal distance between the towing and trailing vehicle. From the ends of the body 62 there depend matched pairs of brackets 65, there being one pair at each end of the body. Each bracket 65 terminates in a split collar 66 adapted to receive one of the trunnions 26 or 27 of the spring shackle block. By means of this construction a damaged body may be removed and replaced in very short order, or a broken spring assembly may be removed and replaced with equal facility.

As is well known in such constructions, the body 62 may provide a tank for fluid for certain purposes, such as water for cooling the brakes of the trailer. I insert a false end disc 70 in each end of the body 62 a short distance inwardly from the edge thereof, and a second disc 71 at the end thereof, leaving a hollow space therebetween. The discs 70 and 71 are provided with concentric seats for the reception of bearing assemblies within which is journaled an axle 74 having means thereon to prevent lateral movement such as the collar 75 illustrated in Fig. 6. The discs 70 and 71 may be permanently affixed such as by welding them to the body 62 but I prefer that at least the disc 71 may be removably associated in order to permit access to the bearings or replacement of parts. The outer end of the shaft 74 extends through an opening 72 in the disc 71 and supports a roller disc 77 of such diameter as to extend above the upper surface of the body 62. The bunk 60 is preferably provided with a pair of horizontal plates 78 affixed to the lower surface of the bunk in such position as to engage the peripheries of the discs 77, thus providing rolling support for the bunk 60. The bunk is thus supported at its ends and is permitted to pivot freely about the pivot 61 as the cab and trailer travel along a curved roadway. An advantage of this construction is that less wear and less replacement of parts is necessary than with previously used constructions.

Having illustrated and described a preferred embodiment of the present invention, it should be apparent to those skilled in the art that the invention permits of modifications in arrangement and details. All such modifications as come within the true spirit and scope of the appended claims are considered to be a part of my invention.

I claim:

1. A trailer comprising a load supporting body, said body comprising a transverse member having a bracket depending from each end thereof, a spring shackle block pivotally engaging the depending end of each of said brackets, a leaf spring assembly extending longitudinally through each of said shackle blocks, a pair of axles supporting said leaf spring assemblies at their ends, and retaining means affixing the ends of said leaf spring assemblies within said axles, said retaining means comprising resilient bushings, surrounding the ends of said leaf spring assemblies.

2. A trailer comprising a load supporting body, said body comprising a transverse member having brackets depending from the ends thereof, a pair of spring shackle blocks pivotally supported at the depending ends of said brackets, a leaf spring assembly mounted in each of said shackle blocks, a pair of axles supporting said leaf spring assemblies at their ends with the ends of said leaf spring assemblies being retained within said axles, and retaining means for each end of said leaf spring assemblies comprising a resilient bushing surrounding the end of a leaf spring assembly, and members adapted to longitudinally compress said resilient bushing to cause said bushing to expand.

3. Means for mounting a trailer body comprising a leaf spring assembly, an axle having a transverse bore therethrough adapted to receive the end of said leaf spring assembly, a pair of filler members positioned one above and one below the end of said leaf spring assembly within said bore, and a resilient bushing surrounding said filler members and engaging the outer surfaces thereof and the inner surface of said bore.

4. Means for mounting a trailer body comprising a leaf spring assembly, an axle having a transverse bore therethrough adapted to receive an end of said leaf spring assembly, a pair of filler members positioned one above and one below the end of said spring within said bore, a resilient bushing surrounding said filler members and engaging the surfaces thereof and of said bore, a pair of end members engageable with the ends of said bushing, and means to draw said end members together to compress said bushing longitudinally and expand the material thereof transversely whereby said bushing firmly engages the outer surfaces of said filler members and the inner surface of said bore.

5. Means for mounting a trailer body comprising a leaf spring assembly, an axle having a tapered, transverse bore therethrough adapted to receive an end of said leaf spring assembly, a pair of tapered filler members positioned one above and one below the end of said spring within said bore, a frusto-conical, resilient bushing surrounding said filler members and engaging the surfaces thereof and of said bore, a pair of end members engageable with the ends of said bushing, and means to draw said end members together to compress said bushing longitudinally and expand the material thereof transversely whereby said bushing firmly engages the outer surfaces of said filler members and the inner surface of said bore.

6. Means for mounting a trailer body comprising a leaf spring assembly, an axle having an outwardly converging, tapered bore therethrough adapted to receive an end of said leaf spring assembly, a pair of filler members positioned one above and one below the end of said spring within said bore, a resilient bushing surrounding said filler members and engaging the surface of said bore, a pair of end members engageable with the ends of said bushing, one of said end members having an opening therethrough to receive said end, and means to draw said end members together to compress said bushing longitudinally and to expand the material thereof laterally whereby said bushing firmly embraces said filler members and engages the inner surface of said bore, the ends of said bore having countersunk seats for the reception of said end members.

7. A trailer comprising a pair of spaced, transverse axles each having a pair of openings near its ends, with said openings intersecting the longitudinal axes of the axles, a pair of spaced, longitudinally extending leaf spring assemblies having their ends extending into said openings beyond the longitudinal axes of the axles, and means to attach each of said spring assembly ends to its associated axle comprising a pair of filler members positioned one above and one below the end of the spring assembly within the opening into which the spring assembly end extends, means preventing relative longitudinal movement of said spring assembly end and said filler members, and means preventing relative movement of said filler members and said axle in the direction longitudinally of said spring assembly.

8. The construction of claim 7 in which said openings are circular in cross section and said filler members and spring assembly ends are free to rotate within the openings.

9. The construction of claim 7 in which said last means comprises an apertured plug rotatably seated against one side of the axle and through which the spring assembly end extends, a second plug rotatably seated against the other side of the axle, and a pair of bolts each extending through said plugs and one of said filler members.

10. Means for mounting a trailer body comprising a leaf spring assembly, a member having a transverse bore therethrough adapted to receive and anchor the end of said leaf spring assembly therein, and means to attach said leaf spring assembly end to said member comprising a pair of filler blocks positioned one above and one below the end of the spring assembly within the bore into which the spring assembly end extends, means preventing relative longitudinal movement of said spring assembly end and said filler blocks, and means preventing relative movement of said filler blocks and said member in the direction longitudinally of said spring assembly comprising an apertured plug rotatably seated against one side of said member and through which the spring assembly end extends, a second plug rotatably seated against the other side of said member, and a pair of bolts each extending through said plugs and one of said filler blocks.

AUGUST BENZ.

REFERENCES CITED

The following references are of record in the file of this patent:

UNITED STATES PATENTS

| Number | Name | Date |
|---|---|---|
| 433,844 | Yaryan | Aug. 5, 1890 |
| 1,763,767 | Fageol | June 17, 1930 |
| 1,845,854 | Tapp | Feb. 16, 1932 |
| 1,875,797 | Assel | Sept. 6, 1932 |
| 1,877,052 | Reid | Sept. 13, 1932 |
| 1,920,390 | Helms | Aug. 1, 1933 |
| 1,940,914 | Marcum | Dec. 26, 1933 |
| 1,946,060 | Buckendale | Feb. 6, 1934 |
| 2,090,874 | Myers | Aug. 24, 1937 |
| 2,218,127 | Urschel | Oct. 15, 1940 |
| 2,501,796 | Tucker | Mar. 28, 1950 |